(12) United States Patent
Lindoerfer et al.

(10) Patent No.: US 8,555,772 B2
(45) Date of Patent: Oct. 15, 2013

(54) DIRECTIONAL CONTROL VALVE, PARTICULARLY FOR CONTROLLING AN ACTUATING CYLINDER OF A TURBO-MACHINE

(75) Inventors: Steffen Lindoerfer, Schrozberg (DE); Lothar Ochs, Nattheim (DE)

(73) Assignee: Voith Patent GmbH, Heidenheim (DE)

( * ) Notice: Subject to any disclaimer, the term of this patent is extended or adjusted under 35 U.S.C. 154(b) by 785 days.

(21) Appl. No.: 12/741,899

(22) PCT Filed: Sep. 16, 2008

(86) PCT No.: PCT/EP2008/007724
§ 371 (c)(1),
(2), (4) Date: Jun. 22, 2010

(87) PCT Pub. No.: WO2009/059658
PCT Pub. Date: May 14, 2009

(65) Prior Publication Data
US 2012/0000353 A1 Jan. 5, 2012

(30) Foreign Application Priority Data
Nov. 9, 2007 (DE) .......................... 10 2007 053 877

(51) Int. Cl.
*F15B 13/04* (2006.01)
*F15B 13/043* (2006.01)
(52) U.S. Cl.
USPC .............................................. 91/365; 91/453
(58) Field of Classification Search
USPC .................... 91/1, 365, 453; 92/5 R
See application file for complete search history.

(56) References Cited

U.S. PATENT DOCUMENTS

| | | | | | |
|---|---|---|---|---|---|
| 4,201,116 | A | * | 5/1980 | Martin | 137/625.64 |
| 4,543,875 | A | * | 10/1985 | Imhof | 137/625.64 |
| 5,115,684 | A | * | 5/1992 | Haeussler | 73/861.48 |
| 5,366,202 | A | * | 11/1994 | Lunzman | 137/625.64 |
| 7,315,165 | B2 | * | 1/2008 | Kleinen et al. | 324/207.26 |
| 7,365,535 | B2 | * | 4/2008 | Muniraju et al. | 324/252 |
| 2007/0114992 | A1 | * | 5/2007 | Muniraju et al. | 324/225 |

FOREIGN PATENT DOCUMENTS

| | | |
|---|---|---|
| DE | 28 30 332 A1 | 1/1979 |
| DE | 603 11 563 T2 | 5/2007 |
| EP | 0 565 982 B1 | 10/1993 |

OTHER PUBLICATIONS

International Preliminary Report of Patentability for PCT/EP2008/007724 dated Sep. 10, 2010. (7 pages).

* cited by examiner

*Primary Examiner* — Thomas E Lazo
(74) *Attorney, Agent, or Firm* — Taylor IP, P.C.

(57) ABSTRACT

A directional control valve including a force-regulated magnet, a control piston, an actuating piston, first and second elastic elements and a conductor. The control piston is displaceable using the force-regulated magnet, the control piston varies the flow cross-section between pressure, piston, and tank connections. The actuation piston has a first and second chamber. The first elastic element acts against a hydraulic pressure in the first chamber. The actuating piston being connected to the control piston by the first elastic element. The second elastic element acts against the hydraulic pressure in the first chamber. The actuating piston being connected by the second elastic element to the control housing or the flange. The conductor is connected to the electromagnet for control of the electromagnet such that the magnetic force and the position of the control, the actuating, and the pilot pistons are regulated by a voltage generated in the conductor.

12 Claims, 2 Drawing Sheets

DIRECTIONAL CONTROL VALVE, PARTICULARLY FOR CONTROLLING AN ACTUATING CYLINDER OF A TURBO-MACHINE

BACKGROUND OF THE INVENTION

1. Field of the Invention

The present invention relates to a directional control valve for controlling working cylinders or servomotors, in particular for controlling an actuating cylinder of a turbo-machine, such as a gas or steam turbine. A control piston (pilot piston) of the directional control valve is displaced using a force-regulated magnet and thus varying the flow cross-section between hydraulic connections and/or alternately producing connections between various connection pairs.

2. Description of the Related Art

Published application DE 28 30 332 describes an electro-hydraulic valve unit having a proportional servovalve, a directional control valve coupled thereto for controlling a working cylinder, and an electromechanical transducer for generating a force which is linearly dependent on the electrical input signal for adjusting the servovalve. The directional control valve has a valve spindle and the valve spindle of the directional control valve is coupled by way of a spring to the valve spindle of the servovalve. On the other side of the valve spindle of the servovalve, there is a second spring, which acts in the opposite direction to the first spring, the spring constant of the second spring being greater than that of the first spring. The electromechanical transducer is implemented as an electromagnet.

The use of directional control valves for the control and/or position regulation of working cylinders is known. For single-acting cylinders, 3/3 directional control valves having a spring return are used and 4/3 directional control valves having a spring return are used for double-acting cylinders. These each have a control piston, which is actuated by way of an electromagnet. The electromagnet presses the control piston against a spring and thus connects a pressure connection P (reference characters are provided as a convenience in this section and while not referring to any of the drawings directly, they do provide a reference to similar connections of the present inventions) to a consumer connection and/or one of two consumer connections A, B, in order to conduct pressurized hydraulic medium by way of the particular connection into a predetermined chamber of the consumer. For example, in the case of double-acting working cylinders, the consumer connection A is connected to a first cylinder chamber of the working cylinder, and the consumer connection B is connected to a second cylinder chamber, which is separated by a cylinder piston from the first cylinder chamber. Depending on which of the cylinder chambers pressurized hydraulic medium is introduced into from a hydraulic pressure supply by way of a directional control valve, a piston rod attached to the piston of the working cylinder is retracted or extended.

In such double-acting cylinders, the 4/3 directional control valve is typically implemented in such a manner that whenever the first consumer connection A and thus the first cylinder chamber of the working cylinder is connected to the pressure connection P, the second consumer connection B and thus the second cylinder chamber of the working cylinder is connected to a tank connection T of the directional control valve or vice versa. The tank connection T is distinguished by a comparatively low hydraulic pressure, so that hydraulic medium slides out of the cylinder chamber connected to the tank connection T and is guided to a hydraulic tank.

Depending on whether, and how far, the control piston of the directional control valve is displaced using the electromagnet against the pressure force of the restoring spring, either the first consumer connection A is connected to the pressure connection P or the second consumer connection B is connected to the pressure connection P and the particular other consumer connection is connected to the tank connection T. Hydraulic medium thus either flows to one or the other side of the piston of the working cylinder and the retraction or extension of the piston and/or a piston rod of the working cylinder, which is attached to the piston, is controlled.

In order to position the piston with its rod at a position, a closed control circuit is required. For this purpose, a position measuring device, also referred to as a position encoder, is provided on the working cylinder, whose measuring signal is returned to control electronics integrated in the electromagnet of the directional control valve. These control electronics compare the measured value to the target value and calculate a new manipulated variable for the magnet from the difference. The force of the magnet then accordingly increases or decreases and displaces the control piston in the required direction in order to correct the location of the piston of the working cylinder. The control piston of the directional control valve is non-positively connected to the magnet armature of the electromagnet. The magnet armature is, the part of the magnet which is retracted or extended from the magnet by varying the control voltage or the control current strength, and the adjustment movement of the control piston is performed directly by the magnet armature, such that both components, the magnet armature and the control piston, always move jointly in the displacement direction of the control piston.

The flow cross-section between the consumer connection A, B and the pressure connection P and/or the tank connection T is determined by a ring gap, which the control piston delimits with a control housing, in which it is situated, so it is displaceable in the axial direction. Because the stroke of the electromagnet is limited, the flow cross-sections which a typical directional control valve can open and close are limited. The diameter of the control piston also cannot be enlarged arbitrarily in order to thus expand the flow cross-sections, because its mass thus increases and it could no longer be exactly dynamically positioned in connection with a spring in the closed control circuit by the magnet. In particular, the occurring mass forces, natural frequencies, friction forces, and oscillations are problematic.

To be able to use directional control valves for controlling actuating cylinders of turbo-machines in spite of the described problems, having a larger control piston diameter for enlarging the flow cross-sections in the directional control valves, on the one hand, there is the possibility of implementing the electromagnets used as larger and stronger. However, this results in higher inductances and larger armature masses, which has disadvantageous effects on the dynamic response, the required installation space, and the costs of the directional control valve.

In another design, additional position measuring devices and/or position encoders are provided for the measurement of the position of the control piston, and the measuring signal is returned to the control electronics of the electromagnet. An enlargement of the magnet is not necessary in these embodiments. However, the sensitivity of the position encoder with respect to temperature and oscillation influences is disadvantageous. In particular in the case of the use of such a directional control valve for controlling and/or regulating an actuating cylinder of steam turbines or gas turbines. The high ambient temperatures encountered by the position encoder, which are caused by the medium of gas or steam, and is varied with respect to its flow quantity, result in short maintenance intervals and early breakdown of the directional control valve.

SUMMARY OF THE INVENTION

The present invention is a directional control valve which is improved with respect to the known embodiments. In particular, the directional control valve according to the invention is able to position the piston rod of a comparatively large working cylinder (single-acting or double-acting) rapidly and exactly and controls the accordingly required large flow quantities precisely and reliably by the directional control valve. Finally, the directional control valve is produced cost-effectively and has a long lifetime.

A directional control valve according to an embodiment of the present invention for controlling working cylinders, servomotors, or the like, in particular for controlling an actuating cylinder of a turbo-machine, such as a gas or steam turbine, has, in addition to a force-regulated magnet, typically an electromagnet, and a hydraulic unit. The hydraulic unit includes a control housing, in which a control piston, referred to as a pilot piston, is situated so it is displaceable in the axial direction of the directional control valve. The control housing has at least three hydraulic connections, for example, precisely three hydraulic connections, in order to implement a 3/3 directional control valve, or four hydraulic connections, in order to implement a 4/3 directional control valve. The connections include a pressure connection P, a consumer connection A and/or B, and a tank connection T. The pressure connection P is intended for connection to a hydraulic pressure supply and the tank connection T is intended for connection to a hydraulic tank. The consumer connection(s) A, B is/are intended for connection to a consumer, the working cylinder or the servomotor.

The flow cross-section between the hydraulic connections A, B, P, T is varied by displacing the pilot piston, as was described in the introduction to the description.

However, an additional actuating unit is provided according to the present invention for the hydraulic unit. The additional actuating unit includes a force-regulated magnet and an additional control piston, which is situated so it is displaceable in the control housing or in a flange attached to the control housing. The term "flange" refers to any suitable structural form of an additional housing or a receptacle device, which can be implemented integrally with the control housing or can be attached thereto, typically non-positively and positively. The control piston is associated with the force-regulated magnet in such a manner, and is in particular supported on a magnet armature thereof or connected non-positively and/or positively thereto, such that the control piston is displaced by the force-regulated magnet as a function of the activation of the magnet. The activation of the magnet, which is implemented as an electromagnet, using a greater voltage or a greater current strength will typically extend the magnet armature further, in particular against the force of an elastic element, such as a compression spring, and thus press the control piston in a direction away from the magnet. In the case of a lower control voltage or a lower current strength, the magnet armature retracts correspondingly, in particular due to the force of the elastic element or the compression spring.

The additional actuating unit has an actuating unit pressure connection p, an actuating unit tank connection t, and an actuating piston connection a. The actuating unit pressure connection p can particularly be connected to a separate pressure supply, which is separated with respect to the pressure connection P and/or the pressure supply of the control housing, and is thus protected from pressure drops due to possible large volume flows through the hydraulic unit.

The actuating unit tank connection t can be connected to the hydraulic tank which is associated with the hydraulic unit or to an additional hydraulic tank.

The actuating unit also has an actuating piston according to an embodiment of the present invention, which is also displaceable in a piston room in the axial direction of the directional control valve, i.e., in the same direction as the pilot piston of the hydraulic unit, and is non-positively and/or positively connected to the pilot piston. The actuating piston divides the piston room into two piston room chambers, which are sealed off from one another, so that a higher or lower pressure can be set in the first piston room chamber than in the second piston room chamber. The first piston room chamber is hydraulically connected to the actuating piston connection a, for example, by way of holes, in particular holes in the axial direction in the housing or cylinder, in which the actuating piston is supported so it is displaceable. The second piston room chamber can be continuously hydraulically connected to the actuating unit tank connection t, for example, but could also be air filled and/or connected to the surroundings of the directional control valve. Other connections are also possible.

The actuating piston is further connected by way of a first elastic element, in particular a compression spring, referred to in the present case as a measuring spring, which acts against the hydraulic pressure force in the first piston room chamber, to the control piston. The connection is in particular positively and/or non-positively, or at least supported thereon, and connected by a second elastic element, which also acts against the hydraulic pressure force in the first piston room chamber. The second elastic element may be in the form of a compression spring, referred to as a restoring spring, connected to the control housing or the flange, again advantageously positively and/or non-positively, or is at least supported on one of the two. The measuring spring can thus cause the above-described retraction of the magnet armature at comparatively low voltages and/or current strengths of the electromagnet.

The first elastic element, in particular the measuring spring, advantageously has a different spring force than the second elastic element, in particular the restoring spring. The measuring spring will typically have a lesser spring force than the restoring spring.

If compression springs are provided as the elastic elements, they are typically situated in the second piston room chamber. Of course, it is also possible to provide one or more tension springs instead of compression springs, in particular instead of the restoring spring, which is/are then advantageously situated in the first piston room chamber or outside the piston room chamber.

The measuring spring is advantageously implemented having a smaller external diameter than the restoring spring and can thus be positioned radially inside the restoring spring in a space-saving manner. The restoring spring encloses the measuring spring in the peripheral direction. Both springs may have approximately the same axial length and/or essentially the same turn count.

An actuator according to an embodiment of the present invention, includes a working cylinder, in particular in the form of an actuating cylinder of a turbo-machine, also has a directional control valve of the described type, which is connected by hydraulic lines to the working cylinder for controlling or regulating the position of the retractable and extendable piston and/or the piston rod of the working cylinder. As known, a position measuring device can be connected to the working cylinder, which detects the position and/or the covered distance of the piston and/or the piston rod of the working cylinder and is connected to a control unit. The position measuring device can be integrated in the force-regulated magnet, in order to regulate the actuation of the control piston and thus the actuating piston and pilot piston by the magnet as a function of the measurement results. The directional control valve itself can be free of any measuring device, which measures the movement or the position of one of the pistons or components connected thereto.

BRIEF DESCRIPTION OF THE DRAWINGS

The invention is to be described for exemplary purposes hereafter on the basis of an exemplary embodiment. In the figures.

DETAILED DESCRIPTION OF THE INVENTION

Figure 1:
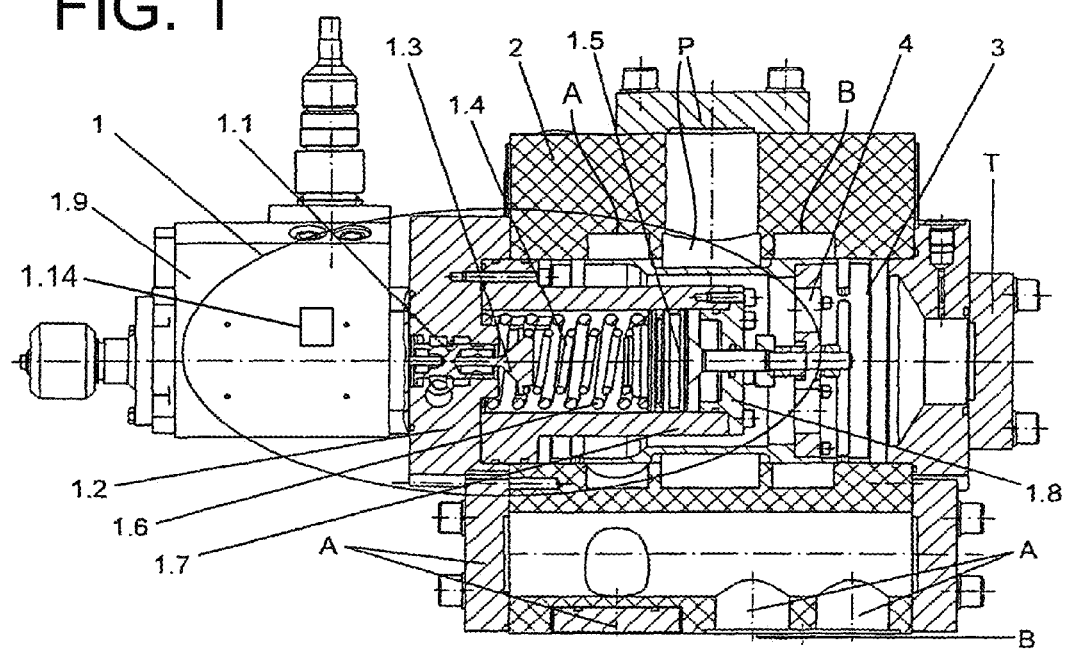
FIG. 1 shows one embodiment of a directional control valve implemented according to an embodiment of the invention.

Referring now to the drawings, and more particularly to FIG. 1, there is illustrated a hydraulic of the present invention, which is formed by a control housing 2 having a pilot piston 3, which is displaceable therein in the axial direction. Control housing 2 has four hydraulic connections, namely a pressure connection P, a first consumer connection A, a second consumer connection B, and a tank connection T. The connections are connected as described above to a hydraulic pressure supply, the two cylinder chambers of a working cylinder, and a hydraulic tank.

A pilot piston 3 has a comparatively large diameter, and the comparatively large cross-section of the various hydraulic connections A, B, P, T, of which pressure connection P and the two consumer connections A and B are connected to annular chambers in control housing 2, allow large volume flows through the directional control valve. The listed three annular chambers, which are formed and/or delimited by control housing 2 together with pilot piston 3, may be the only annular chambers of the hydraulic unit and/or the control housing 2. Pilot piston 3 has holes or slots running in the radial direction, which allow an outflow of hydraulic medium from the first consumer connection A and/or the second consumer connection B to tank connection T as a function of the axial position of piston 3 in control housing 2, in that they have flow-conducting connections thereto. Tank connection T is implemented on a frontal end of the directional control valve in the axial direction thereof in the embodiment shown.

The radial holes or radial slots in pilot piston 3 thus allow the conduction of hydraulic medium into the interior of pilot piston 3 and from there to tank connection T.

Figure 2:
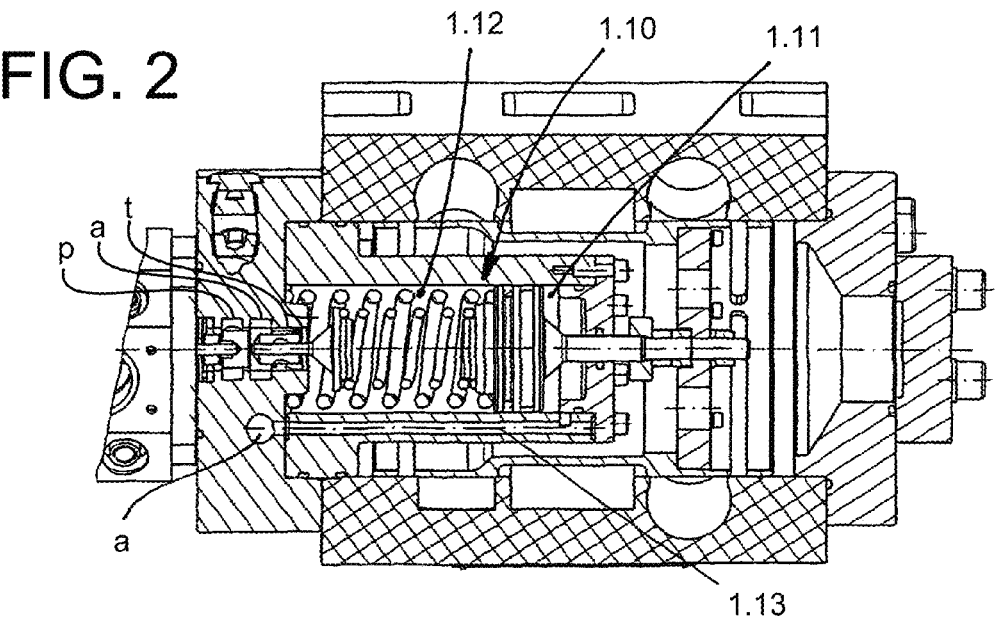
FIG. 2 shows details of the additional control unit, which is shown enlarged from FIG. 1.

Now, additionally referring to FIG. 2 there is shown that the directional control valve is driven by a separate actuating unit 1, which includes a 3/3 way valve having single-acting actuating piston 1.5, which is situated axially thereto, having a spring return. The 3/3 way valve is formed by a control piston 1.1, which is situated so it is displaceable, in the axial direction of the directional control valve, within a flange 1.2 and implements an actuating unit pressure connection p, an actuating piston connection a, and an actuating unit tank connection t with flange 1.2. The actuating unit pressure connection p is connected to a separate pressure supply and is thus protected from pressure drops due to large volume flows in the hydraulic unit.

Control piston 1.1, which is directly connected to the magnet armature of a force-regulated magnet 1.9, is received in a central cylindrical hole of flange 1.2. Two annular notches are incorporated in the hole, which form a first chamber together with control piston 1.1, which is hydraulically connected to the actuating unit pressure connection p and in which the hydraulic pressure of the pressure connection thus prevails, and from a second chamber, which is connected to conduct hydraulic medium to the actuating piston connection a.

The flow connection between the annular chamber connected to the actuating piston connection a and the actuating unit tank connection t is produced via the radial holes in control piston 1.1. From there, the hydraulic medium flows further into an installation room of two compression springs, measuring spring 1.4 and restoring spring 1.6, which apply pressure to actuating piston 1.5, which is described in greater detail hereafter, and finally back in flange 1.2 to the actuating unit tank connection t. The actuating unit pressure connection p can be connected in the same axial plane of flange 1.2.

A cylinder 1.7 is inserted in flange 1.2, and also in control housing 2, in which actuating piston 1.5 is situated so it is displaceable in the axial direction of the directional control valve and is friction-sealed in relation to the inner surface of cylinder 1.7, for example, by way of a seal or a guiding band. Actuating piston 1.5 divides a piston room 1.10, which is delimited by cylinder 1.7 in the peripheral direction and at one axial end and is delimited at the opposing axial end by flange 1.2, into a first piston room chamber 1.11 and a second piston room chamber 1.12. First piston room chamber 1.11 is connected to conduct hydraulic medium by way of holes 1.13, which are introduced in the axial direction into the wall of cylinder 1.7, to the actuating piston connection a. Second piston room chamber 1.12 forms the installation room, which is connected to the actuating unit tank connection t, for measuring spring 1.4 and restoring spring 1.6.

Restoring spring 1.6 is clamped between flange 1.2 and actuating piston 1.5. Measuring spring 1.4 has a smaller diameter than restoring spring 1.6 and can therefore be situated in a space-saving manner in the interior of restoring spring 1.6. Its first axial end is supported by rod 1.3 on control piston 1.1 and its other, opposing end is supported on actuating piston 1.5. Measuring spring 1.4 pushes control piston 1.1 in the direction of magnet 1.9 against a locking ring in the idle position and thus always holds the composite of measuring spring 1.4, rod 1.3, and control piston 1.1 centrally and in a defined manner on the stop.

The coupling of actuating unit 1 and/or actuating piston 1.5 to pilot piston 3 of the "large directional control valve" (the hydraulic unit) is performed non-positively and/or positively. The narrow end of actuating piston 1.5 is fitted in a pilot piston floor, in the form of a disk 4, and is screwed thereon using multiple hex nuts. Of course, other connections also come into consideration. For this purpose, the narrow end of actuating piston 1.5, which can also be referred to as a piston rod, extends through cylinder cover 1.8, which is screwed frontally onto cylinder 1.7 and forms the described axial delimitation of the piston chamber 1.10 and/or first piston room chamber 1.11. This piston rod is also guided through cylinder cover 1.8 and is sealed with respect thereto, for example, using an inserted sealing ring.

Magnet 1.9 is screwed frontally onto flange 1.2, and the tappet rod of its armature presses into the center of control piston 1.1 and moves control piston 1.1 in the direction of actuating piston 1.5 and/or pilot piston 3. Force-regulated magnet 1.9 advantageously includes the control electronics for the pilot drive (actuating unit 1) and for a working cylinder (not shown) attached to the directional control valve, and is particularly interconnected with a position measuring device of the working cylinder, as described herein. The control electronics can be implemented as analog or digital and can be adapted with respect to the controlled system to the size of the working cylinder to be controlled.

Control piston 1.1, actuating piston 1.5, and pilot piston 3 are thus situated concentrically one behind another and aligned with one another in the axial direction. Flange 1.2, cylinder 1.7, and control housing 2 are also situated concentrically to the common longitudinal axis of the various pistons.

The control method executed according to the present invention using the directional control valve shown will be described hereafter.

After predefining a position target value for the working cylinder (not shown) using a current, in particular between 4 and 20 milliamps, applied to magnet 1.9, which is implemented as an electromagnet, the controller immediately experiences a control deviation. The control electronics calculate a magnetic force target value therefrom as the manipulated variable. The changing magnetic force has the result that the magnet armature is deflected and control piston 1.1 presses to the right against measuring spring 1.4. The 3/3 way valve opens, which is formed by control piston 1.1 together with flange 1.2, and releases the passage of the room connected to the actuating unit pressure connection p and the room connected to the actuating piston connection a. Armature and control piston 1.1 move in the direction of actuating piston 1.5 and/or pilot piston 3 until the magnetic force and the measuring spring force are in equilibrium. A spring balance is thus formed. Actuating piston 1.5 moves because of the pressurization of first piston room chamber 1.11 with the supply pressure via the connection of the two cited chambers (p to a) in the direction of control piston 1.1 or away from pilot piston 3 (the positive connection between these two pistons is still to be noted) and compresses measuring spring 1.4. Further, until it closes the passage or flow cross-section between the two chambers again, which are connected using the actuating unit pressure connection p and/or the actuating piston connection a, using its force and holds the system in equilibrium. This equilibrium state can also be referred to as the hydraulic center.

Because of the rigid attachment of actuating piston 1.5 on pilot piston 3, it also executes the movement of actuating piston 1.5 and accordingly regulates the flow cross-section between the hydraulic connections A, B, P, and T of control housing 2 of the hydraulic unit.

Vice versa, if a movement of the working cylinder piston (not shown) and, for this purpose, pilot piston 3 is required in the other direction, the magnetic force is reduced, control piston 1.1 moves in the direction away from actuating piston 5 and/or pilot piston 3, and toward magnet 1.9, and releases the passage (flow cross-section) between the chamber connected to the actuating piston connection a and the actuating unit tank connection t. The hydraulic medium, in particular oil, is pressed out of cylinder 1.7, namely the first piston room chamber 1.11, by expansion of restoring spring 1.6. Actuating piston 1.5 moves in the direction away from control piston 1.1 (to the right in the illustration shown) and relaxes measuring spring 1.4. It relaxes precisely until the prevailing magnetic force presses control piston 1.1 to the right and ends the outflow of the hydraulic medium from first piston room chamber 1.11 by way of the actuating piston connection a and the actuating unit tank connection t to the hydraulic tank (not shown). The magnetic force and the measuring spring force are again in equilibrium.

The magnetic force change and the stroke change of actuating piston 1.5 and thus of pilot piston 3 are proportional to one another. A magnetic force change is therefore always associated with a unique position of actuating piston 1.5 and thus pilot piston 3.

An electrical conductor 1.14 can be situated in the magnetic field of the force-regulated magnet 1.9 to measure the magnetic flux density via a Hall voltage induced in the conductor 1.14. This conductor 1.14 can be connected to magnet 1.9 and/or the control electronics for magnet 1.9 in such a manner that the magnetic force is regulated via a return of the Hall voltage. Therefore, actuating piston 1.5 and pilot piston 3 fixedly connected thereto may be positioned exactly only by changing the magnetic force.

The control movement of pilot piston 3 required for the positioning of the piston rod of a large working cylinder can be performed ideally using the directional control valve implemented according to the invention. A position measurement of actuating piston 1.5 and/or pilot piston 3 is not necessary. A position measuring system in or on the directional control valve, which is sensitive to heat and susceptible to failure, can therefore be dispensed with. A position measuring system is advantageously only provided on the working cylinder.

Figure 3:
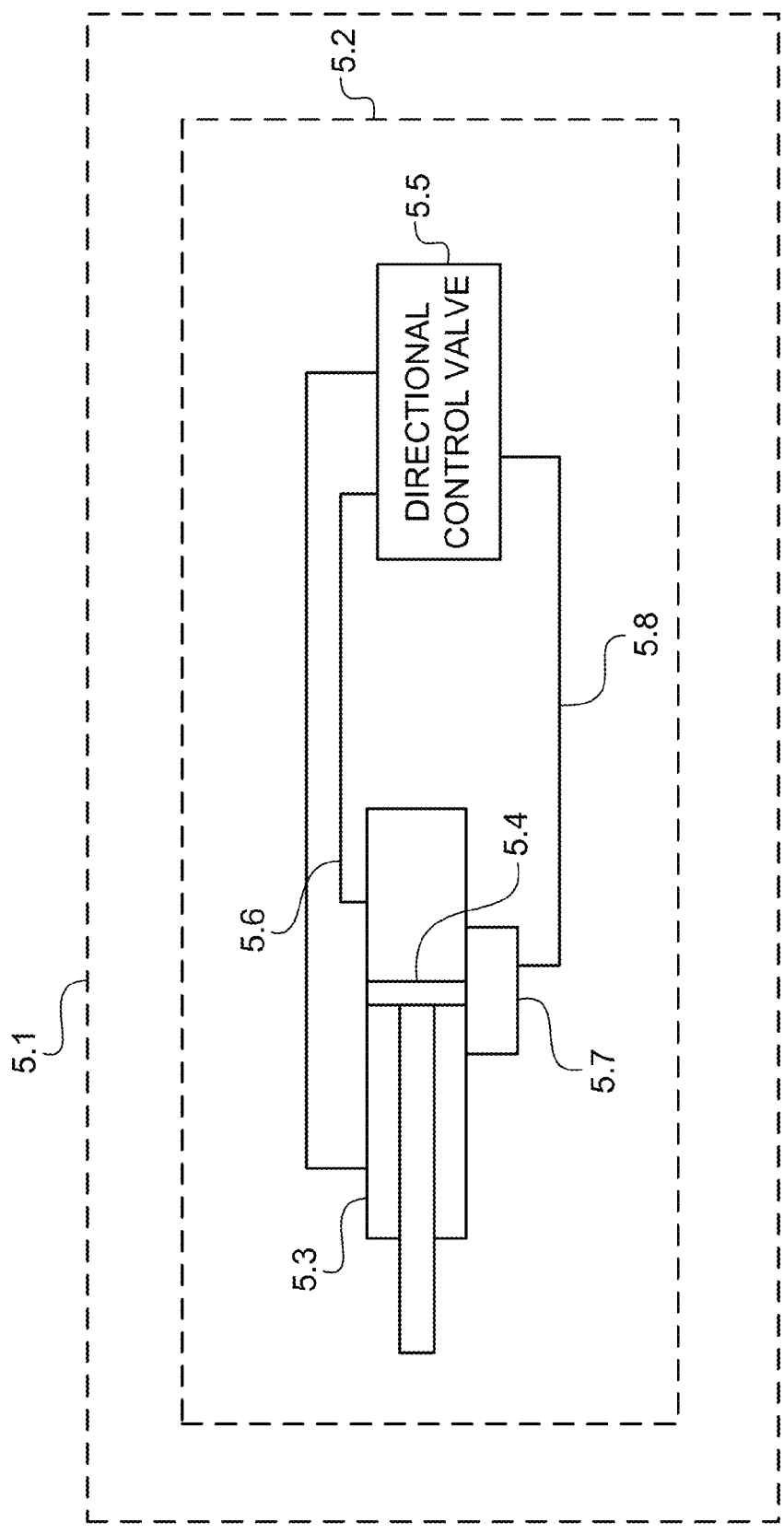
FIG. 3 schematically illustrates an embodiment of the present invention including a turbo machine with a working cylinder.

Referring now to FIG. 3, as can be ascertained from claims 10 and 11 as originally filed, the present invention includes a turbo machine 5.1 with an actuator 5.2 having a working cylinder 5.3 with an extendable and retractable piston 5.4 that is operably connected to a directional control valve 5.5 by way of hydraulic lines 5.6. A position measuring device 5.7 is connected to cylinder 5.3 and an electrical voltage is sent therefrom via signal line 5.8 to directional control valve 5.5.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A directional control valve for controlling working cylinders, servomotors, or an actuating cylinder of a turbo-machine such as gas and steam turbines, the directional control valve comprising:
   a force-regulated magnet (1.9); and
   a hydraulic unit including:
      a pilot piston; and
      a control housing (2), in which said pilot piston (3) is situated so it is displaceable in an axial direction of the directional control valve, said control housing (2) having at least three hydraulic connections including a first pressure connection (P) configured for connection to a hydraulic pressure supply, at least one consumer connection (A, B) configured for connection to the working cylinder or the servomotor, and a tank connection (T) configured for connection to a hydraulic tank, a flow cross-section between the hydraulic connections (A, B, P, T) being variable by displacement of said pilot piston (3);
   an actuating unit (1) including:
      a control piston (1.1), displaceably located in the control housing (2) or in a flange (1.2) attached on the control housing (2), said control piston being displaceable using said force-regulated magnet (1.9), said control piston being configured to vary the flow cross-section between an actuating unit pressure connection (p), an actuating piston connection (a) and an actuating tank connection (t) by displacement;

an actuating piston (1.5), which is non-positively and/or positively connected on said pilot piston (3) such that said actuating piston is displaceable in the axial direction of the directional control valve, said actuation piston divides a piston room (1.10) into a first piston room chamber and a second piston room chamber (1.11, 1.12) which are sealed to one another, the first piston room chamber (1.11) being hydraulically connected to the actuating piston connection (a);

a first elastic element configured to act against a hydraulic pressure force in the first piston room chamber (1.11), said actuating piston (1.5) being connected by way of said first elastic element to said control piston (1.1) or being supported thereon;

a second elastic element configured to act against the hydraulic pressure force in the first piston room chamber (1.11), said actuating piston (1.5) being connected by said second elastic element to the control housing (2) or the flange (1.2) or being supported thereon; and a conductor for the exact positioning of said pilot piston (3), said conductor being situated in a magnetic field of said force-regulated magnet (1.9), said force-regulated magnet being an electromagnet configured for electrical activation, said conductor being electrically connected to one of said electromagnet (1.9) and a control unit for control of said electromagnet (1.9) such that the magnetic force and the position of said control piston (1.1), said actuating piston (1.5), and said pilot piston (3) are regulated by way of a Hall voltage generated in said conductor.

2. The directional control valve of claim 1, wherein at least one of said first elastic element and said second elastic element is a compression spring, said first elastic element (measuring spring 1.4), being positioned in the second piston room chamber (1.12), the second elastic element (restoring spring 1.6), being positioned in the second piston room chamber (1.12).

3. The directional control valve of claim 2, wherein said first elastic element (1.4) has a first spring force and said second elastic element has a second spring force, said first spring force being different than said second spring force.

4. The directional control valve of claim 3, wherein, said first spring force is lesser than said second spring force.

5. The directional control valve of claim 2, wherein said first elastic element is a measuring spring (1.4), said second elastic element being a restoring spring, said measuring spring having a diameter that is smaller than a diameter of said restoring spring (1.6), said measuring spring being enclosed in the peripheral direction on its outer side by said restoring spring (1.6).

6. The directional control valve of claim 1, wherein said control piston (1.1) is displaceable in the axial direction of the directional control valve, said pilot piston (3), said control piston (1.1), and said actuating piston (1.5) being concentrically situated with each other and aligned with one another in the axial direction.

7. The directional control valve of claim 1, wherein the directional control valve has no position measuring device to measure the position of said pilot piston (3), said control piston (1.1), and said actuating piston (1.5) or of components directly connected thereto.

8. The directional control valve of claim 1, wherein said flange has a cylindrical hole therein, said control piston (1.1) being situated so it can slide said cylindrical hole of said flange (1.2).

9. The directional control valve of claim 1, further comprising a cylinder, said actuating piston (1.5) being situated so it can slide inside said cylinder (1.7), said cylinder being one of inserted into said control housing (2), inserted into said flange (1.2), and being implemented as one piece with said flange, said cylinder delimiting the two piston room chambers (1.11, 1.12) in at least one of the peripheral direction, on one side in an axial direction and both sides in the axial direction, a hydraulic connection between said actuating piston connection (a) and the first piston room chamber (1.11) is implemented in said cylinder (1.7) by way of one or more holes (1.13).

10. The directional control valve of claim 1, wherein the actuating unit pressure connection (p) is sealed hydraulically and pressure-tight with respect to the pressure connection (P).

11. An actuator, comprising:
a working cylinder in the form of an actuating cylinder of a turbo-machine, said working cylinder having an extendable and retractable piston;
hydraulic lines;
a directional control valve connected to said working cylinder by way of said hydraulic lines, said directional control valve configured for one of controlling and regulating a position of said extendable and retractable piston of said working cylinder, said directional control valve including:
a force-regulated magnet (1.9); and
a hydraulic unit including:
  a pilot piston; and
  a control housing (2), in which said pilot piston (3) is situated so it is displaceable in an axial direction of the directional control valve, the control housing (2) having at least three hydraulic connections including a first pressure connection (P) configured for connection to a hydraulic pressure supply, at least one consumer connection (A, B) configured for connection to the working cylinder or the servomotor, and a tank connection (T) configured for connection to a hydraulic tank, a flow cross-section between the hydraulic connections (A, B, P, T) being variable by displacement of said pilot piston (3);
an actuating unit (1) including:
  a control piston (1.1), displaceably located in the control housing (2) or in a flange (1.2) attached on the control housing (2), said control piston being displaceable using said force-regulated magnet (1.9), said control piston being configured to vary the flow cross-section between an actuating unit pressure connection (p), an actuating piston connection (a) and an actuating tank connection (t) by displacement;
  an actuating piston (1.5), which is non-positively and/or positively connected on said pilot piston (3) such that said actuating piston is displaceable in the axial direction of the directional control valve, said actuation piston divides a piston room (1.10) into a first piston room chamber and a second piston room chamber (1.11, 1.12) which are sealed to one another, the first piston room chamber (1.11) being hydraulically connected to the actuating piston connection (a);
  a first elastic element configured to act against a hydraulic pressure force in the first piston room chamber (1.11), said actuating piston (1.5) being connected by way of said first elastic element to said control piston (1.1) or being supported thereon;

a second elastic element configured to act against the hydraulic pressure force in the first piston room chamber (1.11), said actuating piston (1.5) being connected by said second elastic element to the control housing (2) or the flange (1.2) or being supported thereon; and a conductor situated in a magnetic field of said force-regulated magnet (1.9), said force-regulated magnet being an electromagnet configured for electrical activation, said conductor being electrically connected to one of said electromagnet (1.9) and a control unit for control of said electromagnet (1.9) such that the magnetic force and the position of said control piston (1.1), said actuating piston (1.5), and said pilot piston (3) are regulated by way of a Hall voltage generated in said conductor.

12. The actuator of claim 11, further comprising a position measuring device connected to said working cylinder, said position measuring device being configured to acquire at least one of a position and a covered distance of said piston of said working cylinder, said control unit configured to regulate said force-regulated magnet (1.9) as a function of measurement results in the form of an electrical voltage received from said position measuring device.

* * * * *